United States Patent [19]

Thigpen et al.

[11] Patent Number: 4,628,500
[45] Date of Patent: Dec. 9, 1986

[54] AIR BEARING STRAIGHT LINE TRACKING PHONOGRAPH TONEARM

[75] Inventors: F. Bruce Thigpen, Tallahassee, Fla.; Edison A. Price, New York, N.Y.

[73] Assignees: Eminent Technology, Inc., Tallahassee, Fla.; Edison Price, Inc., New York, N.Y.

[21] Appl. No.: 739,426

[22] Filed: May 30, 1985

[51] Int. Cl.⁴ ............... G11B 3/38; G11B 21/00
[52] U.S. Cl. ................................. 369/249; 369/255
[58] Field of Search ............... 369/249, 255, 244, 245

[56] References Cited

U.S. PATENT DOCUMENTS

| | | | |
|---|---|---|---|
| 3,390,886 | 7/1968 | Rabinow | 369/249 |
| 3,479,038 | 11/1969 | Eisner | 369/255 |
| 4,239,239 | 12/1980 | Masterson | 369/249 |
| 4,455,641 | 6/1984 | Sliski | 369/249 |

OTHER PUBLICATIONS

"Owners Manual-The Eminent Technology Model One-Air Bearing Straight Line Tracking Tonearm, Eminent Technology, Inc. (undated).

*Primary Examiner*—Steven L. Stephan
*Attorney, Agent, or Firm*—Brumbaugh, Graves, Donohue & Raymond

[57] ABSTRACT

An air bearing straight line tracking phonograph tonearm combines the features of a readily removable decoupled counterweight arm which bears horizontally and vertically adjustable counterweights; a readily removable tonearm tube with tapered wall thickness having an integral headshell, cartridge and stylus; various simple means for vertical and leveling adjustments; and a vertical tracking angle or stylus rake angle control that automatically retains perfect tracking tangency.

6 Claims, 3 Drawing Figures

AIR BEARING STRAIGHT LINE TRACKING PHONOGRAPH TONEARM

BACKGROUND OF THE INVENTION

The present invention relates to an improved air bearing straight line tracking phonograph tonearm.

Conventional tonearms are of the pivotable type. However, the stylus of such tonearms traverses the record or platter groove in a slightly arcuate path from the beginning to the end of the record. This causes sound distortion and groove wear.

Audiophiles, therefore, prefer straight line tracking tonearms whereby the stylus crosses the record groove from the beginning to the end of the record in a straight line, i.e., along the radius of the record. Such tonearms result in less sound distortion or improved sound reproduction and decrease groove wear.

Air bearing straight line tracking tonearms having a mounted spindle tube borne by an air bearing and having a tonearm tube with a cartridge and stylus at one end of the spindle tube and a counterweight assembly at the other end of the spindle tube are commercially available. However, such tonearms still generally have a number of disadvantages. It is difficult to adjust the vertical tracking angle (VTA) or stylus rake angle (SRA) with ease and precision; it is difficult to interchange one cartridge and its counterweights with another cartridge and its preset counterweights; vertical adjustment and/or leveling of the spindle tube and/or tonearm tube are not simple or precise; resonance and tonal qualities are somewhat deficient; high mass in the horizontal plane results from such a configuration; and cuing and protection of the stylus are inadequate.

SUMMARY OF THE INVENTION

It is the principal object of the present invention to provide an improved air bearing straight line tracking phonograph tonearm which overcomes the above-mentioned disadvantages of such known tonearms.

In accordance with the present invention there is provided an improved air bearing straight line tracking phonograph tonearm comprising a mounting base having a vertical extension with a tightening screw and a leveling screw and attachable through a sub-base plate to a mounting board for a phonograph record turntable;

a leveling post attached to the vertical extension of the mounting base and having a horizontal leveling slot and leveling setscrews at its lower end in engagement with the mounting base and a vertical height adjustment slot at its upper end;

a vertical tracking angle arc adjustment block attached to the leveling post by a screw in the vertical height adjustment slot therein and having an arcuate rear face and a transverse slot with a corresponding arcuate rear face having a raised knurled rack thereon;

a rotatable knurled shaft passing through the transverse slot in the vertical tracking angle arc adjustment block and engaging the raised knurled rack on the arcuate rear face of the slot, the knurled shaft having a vertical tracking angle adjustment lever operating handle at one end and also passing through holes in bearing blocks attached to an air bearing housing containing an air manifold tube and having an air supply nipple;

a spindle tube passing through and slidable on an air cushion in the air manifold tube and having attached around one end a coupling joint with a lever arm and an expandable bifurcated collet with a setscrew and having attached around the other end a counterweight cap with a recess having a tightening screw at a slot in the recess end;

a tonearm tube with tapered wall thickness which is readily attachable and detachable at a length adjustment slot in its base end to the collet and which has a damped integral headshell at its outer end attached to a phonograph cartridge having a stylus for engaging and radially tracking a spiral groove in a phonograph record on the turntable;

a decoupled counterweight arm having counterweights thereon and a damped bifurcated leaf spring at one end, said arm being readily attachable and detachable into the recess and slot of the counterweight cap by engagement of the tightening screw with the damped bifurcated leaf spring which allows horizontal motion but prevents vertical motion; and a rotatable eccentric cuing rod parallel to the spindle tube and engageable with the lever arm on the coupling joint, said cuing rod having at one end a cap with an eccentric pin and having at the other end a cuing lever operating handle and mounted in a cuing housing attached to the air bearing housing.

Other features of the tonearm of the present invention are set forth hereinafter.

DETAILED DESCRIPTION OF THE INVENTION

Figure 1:
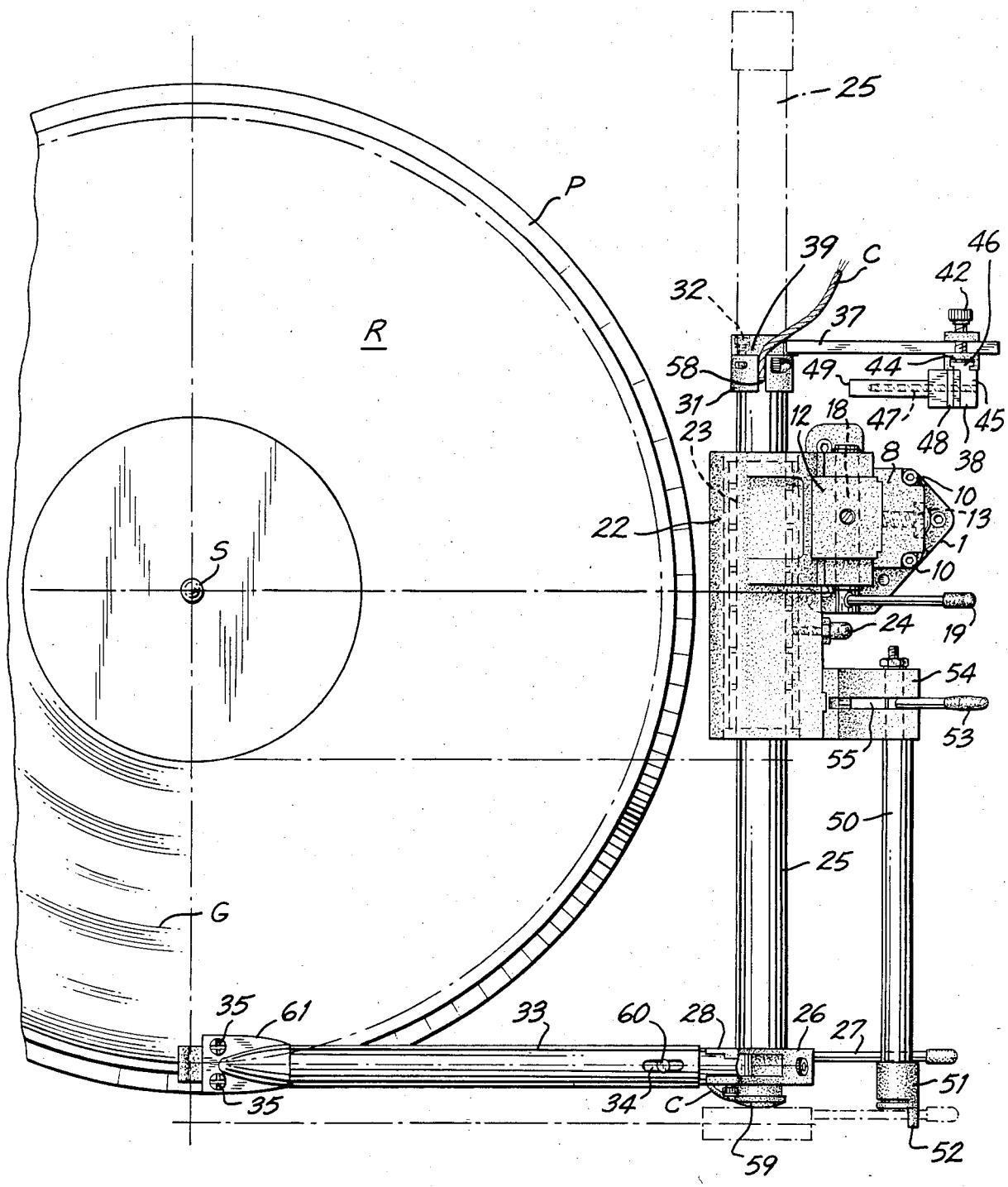
FIGS. 1, 2 and 3 are a top plan view, a side elevational view and a front elevational view, respectively, of the air bearing straight line tracking phonograph tonearm of the invention.
Figure 2:
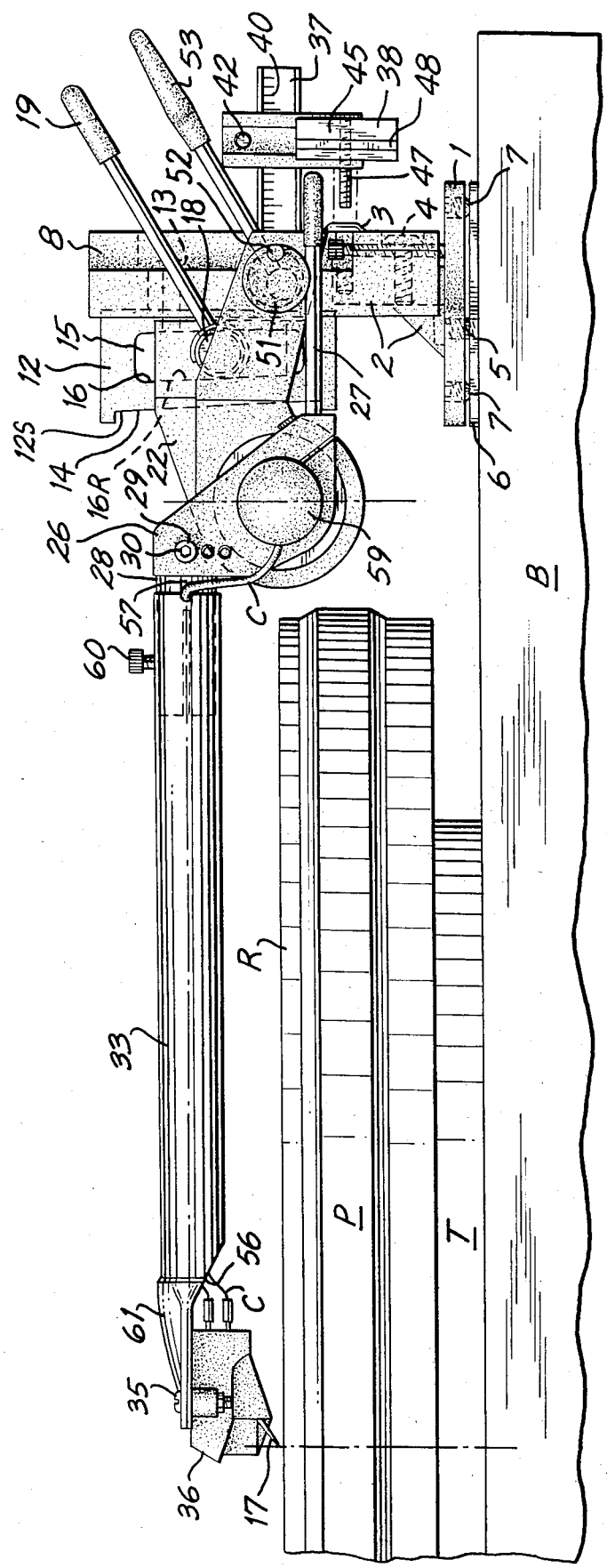
Figure 3:
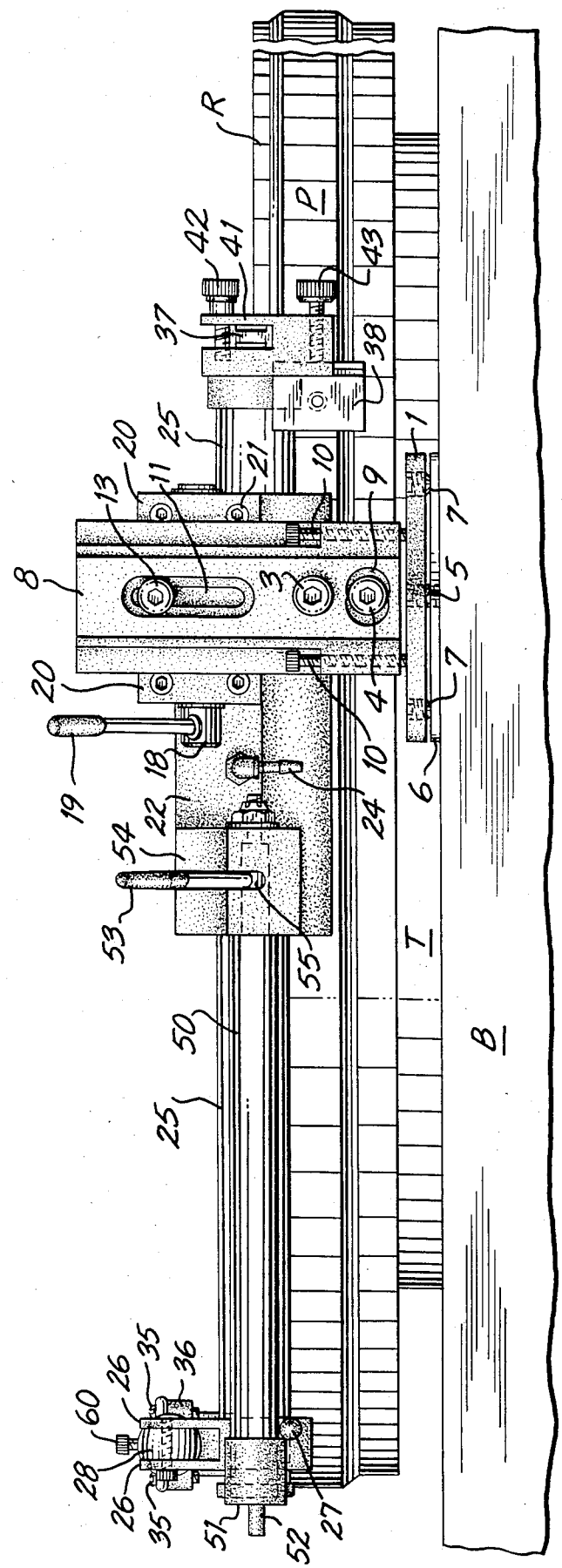

Referring to FIGS. 1-3 of the drawing, there are shown therein a mounting board B, a turntable T, a record pad P, a platter or record R and a turntable spindle S passing through the center hole in the record R, all of which elements or members are used in conjunction with the tonearm of the invention.

Turning now to the air bearing straight line or radial tracking phonograph tonearm shown in FIGS. 1-3 of the drawing, the tonearm comprises a molded plastic mounting base 1 having a vertical extension 2 with a tightening screw 3 and a leveling setscrew 4 and attachable by a single substantially centrally located screw or bolt 5 through a hard aluminum sub-base plate 6 to the wooden mounting board B for the phonograph record turntable T. The mounting base 1 rests on three pointed leveling and height adjustment setscrews 7 in contact with the sub-base plate 6.

A molded plastic leveling post 8 is attached to the front face of the vertical extension 2 of the mounting base 1 by the tightening screw 3 therein and has a horizontal leveling slot 9 therein which engages the leveling setscrew 4 in the vertical extension 2. The leveling post 8 has two leveling setscrews 10 at its lower end in engagement with the upper surface of the mounting base 1 and has a vertical height adjustment slot 11 at its upper end.

A molded plastic vertical tracking angle (or stylus rake angle) arc adjustment block 12 is attached to the back of the leveling post 8 by a setscrew 13 in the vertical height adjustment slot 11 therein which engages a threaded screw hole in the block 12. The block 12 has an arcuate rear face 14 and a transverse slot 15 with a corresponding arcuate rear face 16 having a raised knurled rack 16R thereon. The radii of the two arcuate faces 14, 16 are centered on the record radius or centerline traversed by the stylus 17. The knurling of the rack 16R can be in the form of the fine diagonal grooves, e.g., 30° with a circular pitch 50. The vertical tracking angle arc adjustment block 12 also has an integral scale 12S on its arcuate rear face 14 marked with divisions indicating vertical tracking angle adjustment in ¼° steps.

A rotatable knurled stainless steel shaft 18 passes through the transverse slot 15 in the vertical tracking angle (or stylus rake angle) arc adjustment block 12 and engages the raised knurled rack 16R on the arcuate rear face 16 of the transverse slot 15. The knurling on the shaft 18 can also be in the form of fine diagonal grooves, e.g., 30° with a circular pitch 50. The knurled shaft 18 has an aluminum vertical tracking angle adjustment lever operating handle 19 at one end and also passes through holes in molded plastic bearing blocks 20. The bearing blocks 20 are attached by screws 21 to a molded plastic air bearing housing 22 which contains a metallic perforated air manifold tube 23 of known construction and has an air supply nipple 24. One end of an air hose (not shown) is attached to the air supply nipple 24 while the other end of the air hose is attached to a quiet air pump (not shown).

An aluminum spindle tube 25 passes through and is slidable on an air cushion in the air manifold tube 23. The spindle tube 25 has attached around one end a molded plastic coupling joint 26 with an aluminum lever arm 27 and a metallic expandable bifurcated collet 28 with a setscrew 60. The collet 28 has a hole and the coupling joing 26 has a series of three vertically arranged holes 29, one of which series of holes 29 is aligned with the collet hole and has a connecting screw 30 therethrough for vertical adjustment of the collet 28 on the coupling joint 26. The spindle tube 25 has attached around the other end a molded plastic counterweight cap 31 with a recess having a tightening screw 32 at a slot in the recess end.

An aluminum tonearm tube 33 is readily attachable and detachable at a length adjustment slot 34 in its base end to the collet 28 in a rigid manner by the setscrew 60. The tonearm tube 33 has a tapered wall thickness (not shown) which decreases from its base end towards its outer end in order to reduce mass and resonances. The tonearm tube is filled with an inert damping material, such as lightweight foam rubber. The tonearm tube 33 has a damped aluminum integral headshell 61 at its outer end attached by screws 35 to a phonograph cartridge 36 having a stylus 17 for engaging and radially tracking a spiral groove G in the phonograph record R on the turntable T. The tonearm tube 33 has the integral headshell 61 for maximum rigidity with minimum mass. The damper material in the headshell 61 can be Teflon (polytetrafluoroethylene).

A molded plastic or aluminum decoupled counterweight arm 37 hving lead counterweights 38 thereon and a damped bifurcated stainless steel leaf sping 39 at one end is readily attachable and detachable into the recess and slot of the counterweight cap 31 by engagement of the tightening screw 32 with the damped bifurcated leaf spring 39. The damped leaf spring 39 is oriented so as to allow horizontal motion but prevent vertical motion, i.e., decoupling, of the counterweight arm 37 and counterweights 38. Decoupling is necessary to reduce the effective mass seen by the cartridge 36 in the horizontal plane which allows the use of high compliance cartridges 36. The stiffness of the damped leaf spring 39 can be increased to allow higher horizontal mass to match low compliance cartridges 36. The damper material for the leaf spring 39 can be an elastomer. Damping provides the desirable quality of little or no rise in amplitude at resonance horizontally. Also separate horizontal and vertical resonant frequencies can be achieved by decoupling only in one plane of motion. The decoupled counterweight arm 37 is an I-beam marked with an integral millimeter scale 40 and has means for horizontally and vertically adjusting the counterweights 38 thereon. The location of the counterweights 38 along the counterweight arm 37 determines the stylus pressure on the record groove G. The position and amount of the counterweights 38 determine the vertical effective mass.

The adjusting means for the counterweights 38 comprise a molded plastic bifurcated carrier block 41 with a friction spring slidable horizontally along the counterweight arm 37 and having a tightening screw 42 and a setscrew 43 on one side and a keyway 44 on the opposite side. A lead master weight 45 (15 g.) with a key 46 is slidable vertically in the keyway 44 and locked into position by the setscrew 43. The keyed lead master weight 45 has a threaded rod 47 extending therefrom and parallel to the counterweight arm 37. Three auxiliary lead weights 48 (5 g, 5 g, 15 g) having a central hole can be added or subtracted singly or in combination (affording a variation from 15 g to 40 g by 5 g steps) by placing or removing them onto or off of the threaded rod 47. The auxiliary weights 48 can be held on the threaded rod 47 by an internally and externally threaded aluminum sleeve 49.

A rotatable eccentric aluminum cuing rod 50 is parallel to the spindle tube 25 and is engageable with the top of the lever arm 27 on the coupling joint 26. The cuing rod 50 has at one end a molded plastic cap 51 with an eccentric pin 52 and has at the other end an aluminum cuing lever operating handle 53. The cuing rod 50 is mounted in a molded plastic cuing housing 54 having a slot 55 for the cuing lever operating handle 53. The cuing housing 54 is attached by a screw into a threaded hole in the air bearing housing 22.

The electrical cable C for the phonograph cartridge 36 passes through a hole 56 in the bottom of the outer end of the tonearm tube 33, then through the tonearm tube 33 and out the space 57 between the bifurcated collet 28 and then into and through the spindle tube 25 and exits therefrom through a space 58 in the counterweight cap 31 and then to the electrical system of the phonograph. The electrical cable C passes into the spindle tube 25 by way of a removable cap 59 having a male plug (not shown) which engages a female socket (not shown) cemented to the interior of the spindle tube 25.

From the above detailed description of the tonearm of the present invention taken in conjunction with FIGS. 1-3 of the drawing, it will be noted that the tonearm has a combination of improved features.

Thus vertical adjustment and/or leveling of the spindle tube 25 and/or the tonearm tube 33 relative to the surface of the record R can be achieved easily and with precision by selecting a number of means, namely, (a) adjusting the mounting base leveling and height adjustment setscrews 7 which contact the sub-base plate 6, (b) adjusting the leveling setscrews 10 in the leveling post 8 against the upper surface of the mounting base 1, (c) adjusting the leveling setscrew 4 in the vertical extension 2 of the mounting base 1 along the horizontal leveling slot 9 in the leveling post 8, (d) adjusting the setscrew 13 in the vertical tracking angle arc adjustment block 12 along the height adjustment slot 11 in the leveling post 8, and/or (e) adjusting the location of the collet connecting screw 30 through one of the series of vertically arranged holes 29 in the coupling joint 26. The width of the slot 34 also allows adjustment of azimuth of the cartridge 36.

The effective length of the tonearm tube 33 can be adjusted by the location of the collet setscrew 60 along the length adjustment slot 34 in the tonearm tube 33 so as to set overhang at the tip of the stylus 17.

The vertical tracking angle (VTA) or stylus rake angle (SRA) can be finely adjusted with ease and precision while playing a record by manipulating the operating handle 19 on the rotatable knurled shaft 18 to move the knurled shaft 18 along the stationary arcuate knurled rack 16R and thereby simultaneously move in an arc the air bearing housing 22, spindle tube 25, tonearm tube 33, counterweight arm 37 and cuing rod 50. The position of the stylus 17 to the point-of-play on the record groove G is maintained preventing any displacement of the stylus 17 when the vertical tracking angle is adjusted.

It is easy to interchange one cartridge 36 and its counterweights 38 with another cartridge 36 and its preset counterweights 38. This can be done merely by unscrewing the connecting screw 30 and removing the collet 28 and the affixed tonearm tube 33 with the attached cartridge 36 while disconnecting the male plug from the female socket and by loosening the tightening screw 32 in the counterweight cap 31 while pulling out the counterweight arm 37 with its attached counterweights 38. The reverse procedure can be followed in remounting another cartridge 36 and its preset counterweights 38.

Resonance within the tonearm tube 33 is improved by using a damped integral headshell 61, a tonearm tube 33 having a tapered wall thickness which decreases from its base towards its outer end in order to spread the resonant frequency and internal foam damping of the tonearm tube 33.

The horizontal resonant frequencies which result from the compliance of the cartridge 36 and the mass of the moving parts are controlled by a decoupled counterweight 38. Decoupling lowers the effective mass seen by the cartridge 36 in the horizontal plane by having a lower natural farequency (2 Hz) between the bifurcated leaf spring 39 and counterweights 38 and spindle tube 25 than would result between the cartridge compliance and the mass of the tonearm tube 33 and spindle tube 25 (5 Hz–15 Hz). As a result of decoupling, the cartridge 36 only sees the mass of the tonearm tube 33, coupling joint 26 and spindle tube 25 which is much lower than would result if the counterweight 38 is directly connected.

Vertically, because no decoupling exists, the resonant frequencies are controlled by the moment of inertia about the axis of rotation of the spindle tube 25. This moment of inertia or mass is changed by altering counterweight values and position.

The advantage of splitting and having control over resonant frequencies is two-fold. First, variability allows the use of cartridges 36 which have a wide compliance range. Second, different vertical and horizontal resonant frequencies do not sum, halving the rise in amplitude at resonance. Further, the amount of damping used on the leaf spring 39 can control the rise in frequency response at resonance in the horizontal plane. A critically damped spring 39 can result in no rise in frequency response in the horizontal plane which is desirable. If a cartridge 36 drives a moving system with slightly higher horizontal mass, this is desirable because most low frequency energy which exists in modern records is cut horizontally.

Provision is made for adequate cuing and protection of the stylus 17. Thus, the lever arm 27 on the coupling joint 26 is manually slid into place against the cuing cap 51 which automatically aligns the tonearm tube 33 and cartridge stylus 17 tangent with the start of the record groove G (as shown in solid lines in FIG. 1). The eccentric cuing rod 50 is rotated by manipulating its operating handle 53 to lower the stylus 17 gently onto the start of the record groove G. When the stylus 17 has reached the end of the record groove G and the spindle tube 25 has slid through the air manifold tube 23 (as shown in phantom lines in FIG. 1), the eccentric cuing rod 50 is reversely rotated by manipulating its operating handle 53 to raise the stylus 17 gently off the end of the record groove G. Thereafter, the spindle tube 25 and the tonearm tube 33 with its stylus 17 are manually slid over into engagement with the eccentric pin 52 on the cuing rod cap 51 (as further shown in phantom lines in FIG. 1) by gripping and sliding the lever arm 27 on the coupling joint 26 and the eccentric cuing rod 50 is rotated by manipulating its operating handle 53. This action lowers the stylus 17 beyond the edge of the record R as well as beyond the edge of record pad P so as to avoid contact at rest and protect the stylus 17.

Moreover, the cartridge adjustments and the mechanical and electrical disconnect provisions, which are usually located at the headshell end of the tonearm tube, are instead located near the base end of the tonearm tube where their mass has the least effect on vertical inertia.

The tonearm of the present invention enables the stylus to be adjusted to have a vertical tracking angle which matches any different vertical tracking angle used to cut a record by the mastering stylus for the best performance from the phonograph cartridge. In addition, the tonearm remains exactly on the centerline of the record groove even while vertical tracking angle adjustments are made during actual play.

The tonearm tube is long compared to mechanical straight line tracking tonearm tubes and hence minimizes warp wow.

What is claimed is:

1. An air bearing straight line tracking phonograph tonearm comprising
   a mounting base having a vertical extension with a tightening screw and a leveling setscrew and attachable through a sub-base plate to a mounting board for a phonograph record turntable;
   a leveling post attached to the vertical extension of the mounting base and having a horizontal leveling slot and leveling setscrews at its lower end in engagement with the mounting base and having a vertical height adjustment slot at its upper end;
   a vertical tracking angle arc adjustment block attached to the leveling post by a setscrew in the vertical height adjustment slot therein and having an arcuate rear face and a transverse slot with a corresponding arcuate rear face having a raised knurled rack thereon;
   a rotatable knurled shaft passing through the transverse slot in the vertical tracking angle arc adjustment block and engaging the raised knurled rack on the arcuate rear face of the slot, the knurled shaft having a vertical tracking angle adjustment lever operating handle at one end and also passing through holes in bearing blocks attached to an air bearing housing containing an air manifold tube and having an air supply nipple;

a spindle tube passing through and slidable on an air cushion in the air manifold tube and having attached around one end a coupling joint with a lever arm and an expandable bifurcated collet with a setscrew and having attached around the other end a counterweight cap with a recess having a tightening screw at a slot in the recess end;

a tonearm tube with tapered wall thickness which is readily attachable and detachable at a length adjustment slot in its base end to the collet and which has a damped integral headshell at its outer end attached to a phonograph cartridge having a stylus for engaging and radially tracking a spiral groove in a phonograph record on the turntable;

a decoupled counterweight arm having counterweights thereon and a damped bifurcated leaf spring at one end, said arm being readily attachable and detachable into the recess and slot of the counterweight cap by engagement of the tightening screw with the damped bifurcated leaf spring which allows horizontal motion but prevents vertical motion; and a rotatable eccentric cuing rod parallel to the spindle tube and engageable with the lever arm on the coupling joint, said cuing rod having at one end a cap with an eccentric pin and having at the other end a cuing lever operating handle and mounted in a cuing housing attached to the air bearing housing.

2. An air bearing straight line tracking phonograph tonearm according to claim 1 wherein the vertical tracking angle arc adjustment block has an integral scale on its arcuate rear face marked with divisions indicating vertical tracking angle adjustment in ¼° steps.

3. An air bearing straight line tracking phonograph tonearm according to claim 1 wherein the decoupled counterweight arm is an I-beam marked with an integral millimeter scale and has means for horizontally and vertically adjusting the counterweights thereon.

4. An air bearing straight line tracking phonograph tonearm according to claim 1 wherein the mounting base rests on three pointed leveling and height adjustment setscrews in contact with the sub-base plate.

5. An air bearing straight line tracking phonograph tonearm according to claim 1 wherein the tapered wall thickness of the tonearm tube decreases from its base end towards its outer end.

6. An air bearing straight line tracking phonograph tonearm according to claim 1 wherein the collet has a hole and the coupling joint has a series of vertically arranged holes, one of which series of holes being aligned with the collet hole and having a connecting screw therethrough.

* * * * *